United States Patent Office 3,237,493
Patented Mar. 1, 1966

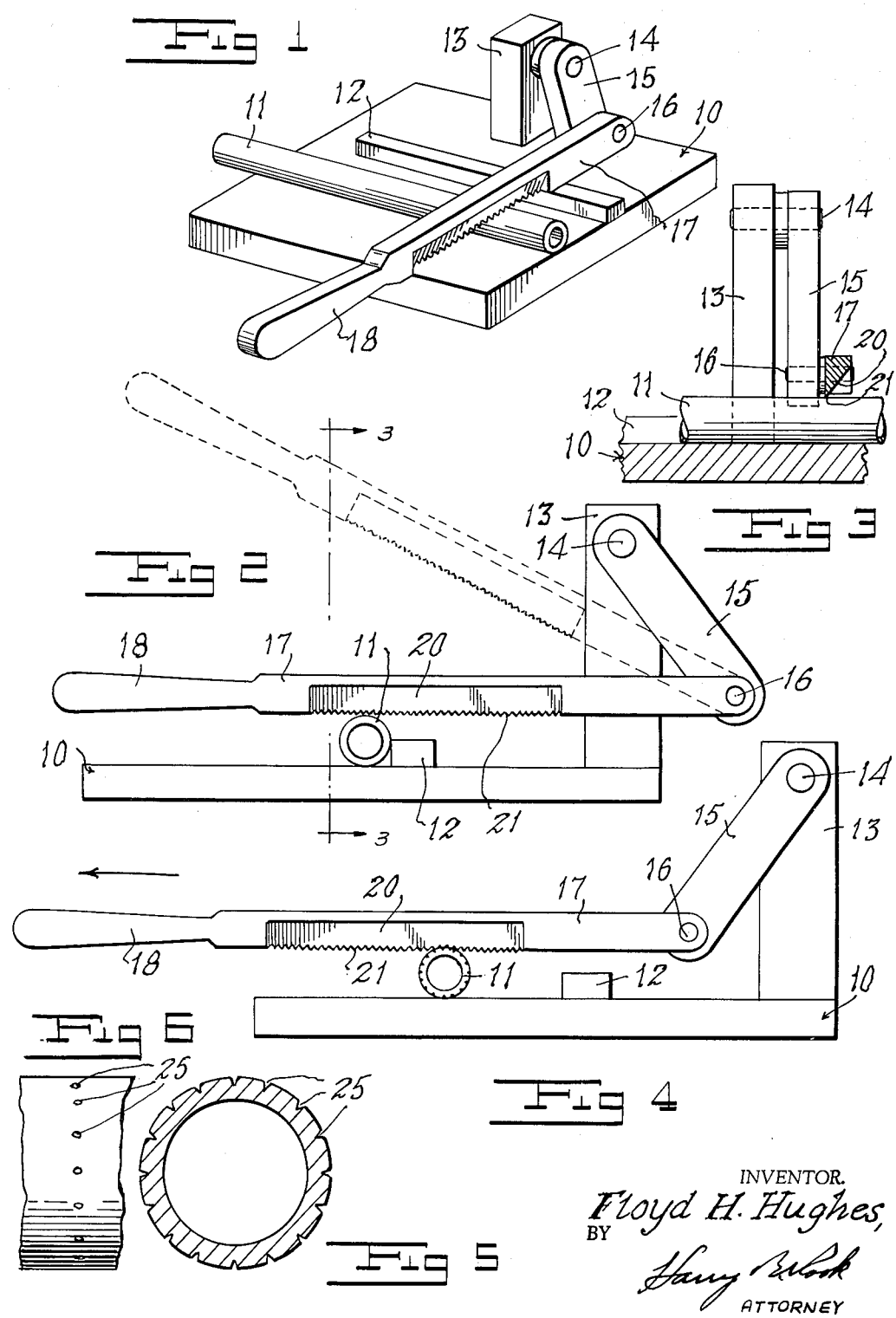

3,237,493
METHOD OF WEAKENING VITREOUS TUBES TO FACILITATE BREAKING THEREOF
Floyd H. Hughes, 1124 Fairmont Ave., Vineland, N.J.
Filed June 24, 1964, Ser. No. 377,553
1 Claim. (Cl. 83—2)

This invention relates to a method of processing glass tubes of small diameter at a specific point or location so that the tube can be easily and cleanly broken.

Glass tubes of small diameter are used for packaging vaccines, drugs and perfumes and these tubes are weakened in such a manner that they can be easily fractured or broken when it is desired to use the contents but it is essential that they be weakened in such a manner that the tube will not be subject to accidental fracture.

The invention has for its salient object the provision of a method of weakening a tube of glass or vitreous material in such a manner that the tube can be easily and quickly and cleanly broken when desired.

Another object of the invention is to provide a method of weakening the surface of the tube in such a manner that the tube can be cleanly fractured but will not be subject to accidental breakage.

Further objects of the invention will appear from the following specification taken in connection with the drawings which form a part of this application in which:

FIG. 1 is a perspective view of one form of apparatus constructed to carry out the invention;

FIG. 2 is a side elevation of the apparatus shown in FIG. 1;

FIG. 3 is a sectional elevation taken substantially on line 3—3 of FIG. 2 looking in the direction of the arrows;

FIG. 4 is an elevational view similar to FIG. 2 but showing the apparatus in operation forming circumferential indentations in the outer surface of the tube;

FIG. 5 is a sectional elevation of the tube at the point in its length where the indentations are formed; and FIG. 6 is a fragmentary view taken at right angles to FIG. 5.

The invention as above stated refers to a method of weakening a tube of glass or vitreous material of small diameter by forming indentations in the outer surface of the tube at a specific location at which the tube is to be broken.

Although the invention is not limited to any particular apparatus, one form of apparatus by which the method can be accomplished is illustrated in the drawings.

In FIG. 1 there is shown a base block 10 on which the tube 11 is placed and may be rolled and a transverse bar 12 is mounted on the base block 10 to form a stop. At one end of the block there is positioned an upright member 13 having pivoted thereon at 14 a link 15. The lower end of link 15 is pivoted at 16 to an elongated bar 17 having a handle 18 at one end.

Intermediate its ends the bar has a bevelled portion 20 and the lower end of the bevelled portion is serrated as shown at 21.

When the glass tube is to be circumferentially weakened it is placed on the block 10 and the bar 17 is lowered from the dotted line position in FIG. 2 to the full time position and rests on top of the bar. The bar 17 with serrated edge 21 resting on the tube 11 is then moved from the position shown in FIG. 2 to the position shown in FIG. 4 and as the glass tube is rolled on the upper surface of the block the serrations in the bar 17 will form a series of indentations 25 which extend into the outer surface of the tube and are sharply defined by the teeth of the serrated portion 21 of the bar 17. This is clearly illustrated in FIGS. 5 and 6. It will be obvious that the desired pressure on the tube can be controlled by pressing down on the handle 18.

Although, as above stated, the drawings illustrate and the foregoing description describes one form of apparatus for carrying out the method, it should be noted that applicant's invention consists of the method outlined and not in the apparatus and that other forms of apparatus may be utilized for this purpose.

Reduced to its simplest terms the method can be carried out by causing rolling engagement of the tube with a sharply serrated blade of hard material with sufficient and controlled pressure so that a line of punctures or indentations is pressed into the outer surface of the tube. The operation just described actually punctures or penetrates the outer surface skin of the tube, each penetration or puncture having an extremely acute angle at the bottom thereof.

No limitations are intended other than those imposed by the following claim:

The method of weakening a specific portion of a glass tube in preparation for fracture for breaking thereof which consists of puncturing the surface of the tube in a series of spots spaced apart circumferentially of the tube.

References Cited by the Examiner
UNITED STATES PATENTS 2,116,129    5/1938    Stringer _____ 225—2
2,839,871    6/1958    Austin _____ 225—96.5

FOREIGN PATENTS 167,900    6/1956    Australia.

WILLIAM W. DYER, Jr., Primary Examiner.
F. T. YOST, Assistant Examiner.